United States Patent [19]

Wu

[11] Patent Number: 5,997,105
[45] Date of Patent: Dec. 7, 1999

[54] SWIFT WHEEL LOCKING DEVICE FOR GOLF CART

[75] Inventor: Fang-Li Wu, Tainan Hsien, Taiwan

[73] Assignee: Sports World Enterprise Co., Ltd., Tainan Hsien, Taiwan

[21] Appl. No.: 09/013,886

[22] Filed: Jan. 27, 1998

[51] Int. Cl.⁶ ................................................. B60B 35/00
[52] U.S. Cl. ...................... 301/124.1; 301/114; 301/126; 301/131; 280/DIG. 6
[58] Field of Search .................................. 301/111, 124.1, 301/126, 114, 131, 112, 1; 280/DIG. 6; 411/522

[56] References Cited

U.S. PATENT DOCUMENTS

| | | | |
|---|---|---|---|
| 4,978,175 | 12/1990 | Wu | 301/111 |
| 5,029,946 | 7/1991 | Liao | 301/111 |
| 5,171,068 | 12/1992 | Wu | 301/131 |
| 5,435,581 | 7/1995 | Rosenfield | 280/DIG. 6 |
| 5,466,051 | 11/1995 | Liao | 301/111 |
| 5,507,566 | 4/1996 | Chen | 301/111 |
| 5,529,385 | 6/1996 | Tsao | 301/111 |
| 5,658,054 | 8/1997 | Wu | 301/111 |

FOREIGN PATENT DOCUMENTS

| | | | |
|---|---|---|---|
| 2238277 | 5/1991 | United Kingdom | 301/111 |
| 2253194 | 9/1992 | United Kingdom | 301/111 |

*Primary Examiner*—D. Glenn Dayoan
*Assistant Examiner*—Long Bao Nguyen
*Attorney, Agent, or Firm*—Rosenberg, Klein & Lee

[57] ABSTRACT

A swift wheel locking device for a golf cart includes a wheel axle and a bracket member. The wheel axle has a small diameter portion with an annular groove for a locking member to lock or unlock the wheel axle with a solid portion of the bracket member by means of a control member movably fitted in and on the solid portion and extending a little out of a cap covering on the solid portion and keeping the locking member and the control member in place in and on the bracket member. A press portion of the control member extending out of the cap can be pressed to lock and unlock swiftly the locking member with and from the wheel axle.

1 Claim, 7 Drawing Sheets

SWIFT WHEEL LOCKING DEVICE FOR GOLF CART

BACKGROUND OF THE INVENTION

This invention relates to a swift wheel locking device for a golf cart, particularly to one having a wheel axle and a bracket member swiftly locking and unlocking the wheel axle by means of a control member moving a locking member to lock and unlock the wheel axle.

A golf cart is indispensable for golf players to carry various golf clubs around a golf course. A conventional golf cart shown in FIG. 6 has a releasable wheel assembly having an axle 11 combined with a bracket member 10 attached to a lower end of a leg of a golf cart. The axle 11 has an annular groove 12 formed in an outer end for a C-shaped ring 13 to securely keep the wheel 14 on the axle 11.

Further, as shown in FIG. 7, when the conventional golf cart having the above-mentioned releasable wheel assembly is to be packaged for transportation, the golf cart body has a height LA and a width L1, and a height LA+LB and a width L1+L2 after the brackets 10 are combined with the cart body, necessitating a large carton for packing the whole golf cart, resulting in a larger cost for packaging and transporting.

There is another conventional releasable wheel assembly disclosed in U.S. Pat. Ser. No. 5,029,946 filed in July, 1991 shown in FIG. 8. It includes a bracket member 4 having a lower solid portion 41, a coil spring 53 and a control member 5 contained in the lower solid portion 41 for control and unlocking an axle 11. The control member 5 is T-shaped, having a flange 51 formed in an upper end for pressing the locking member 5 manually, and a key 52 in the form of a plate formed with spaced slots 521 and 522 extending down from the flange 51. The first slot 521 is dimensioned to allow a relative movement between the key 52 and a rivet 42 along a longitudinal direction of the key 52 and the second slot 522 is dimensioned to allow the axle 11 passing through the key 52 from an outer side portion 524 of a larger diameter and the groove 112 of the axle 11 being engaged by an inner side portion 523 of smaller diameter.

In operation, as shown in FIGS. 9 and 10, the flange 51 is pressed manually to overcome biasing forces of the coil spring 53 and move the locking member 5 inwardly, the inner side 523 of the second slot 522 is disengaged from the groove 112 and the axle 11 is located within the outer side portion 524, the wheel set 3 can be removed by retracting the axle 11 from the bracket member 4. The rivet 42 serves as a guider for the locating slot 522 of the key 52 of the locking member 5 in assembly and disassembly operations of the wheel set 3.

SUMMARY OF THE INVENTION

This invention has been devised to offer another kind of swift wheel locking device for a golf cart, including a bracket member and a wheel axle swiftly locked and unlocked with the bracket member.

The main feature of the invention is a locking member, and a control member disposed in a solid portion of a bracket member. The control member has a press portion extending out of a cap covering on the solid portion and possible to be pressed manually to move up the locking member for a wheel axle possible to be inserted in a lateral hole of the solid portion and then released to let the locking member elastically pushed down by a coil spring to fit in an annular groove of the wheel axle, locking the wheel axle.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
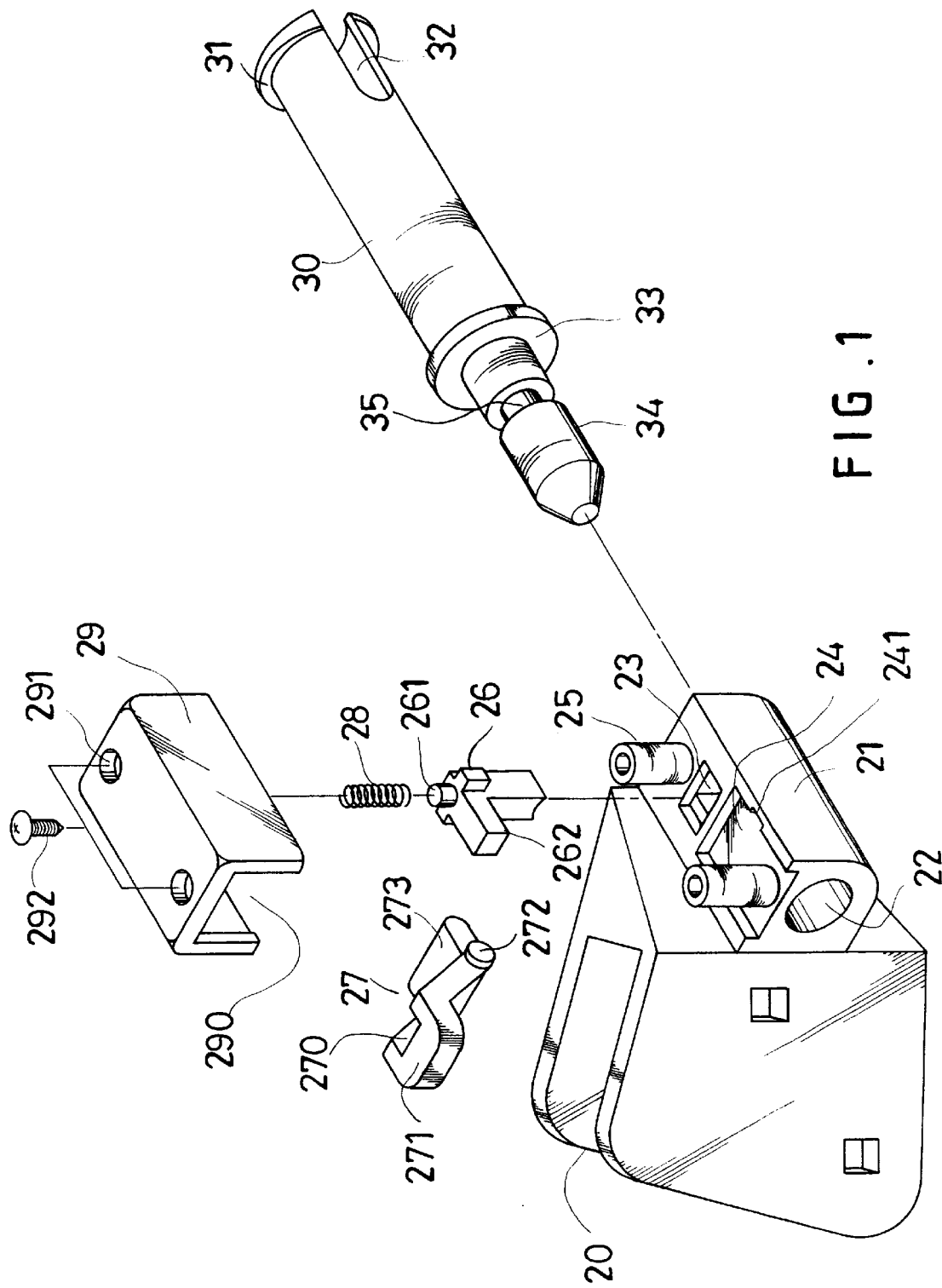
FIG. 1 is an exploded perspective view of a swift wheel locking device for a golf cart of the present invention.

A preferred embodiment of a swift wheel locking device for a golf cart in the present invention, as shown in FIG. 1, includes a bracket member 20 and a wheel axle 30 as main components.

The bracket member 20 is formed nearly as a U-shaped block, having a solid portion 21 formed at one side, a lateral through hole 22 formed in the solid portion 21, a first hole 23 and a second hole 24 formed in an upper surface of the solid portion 21 and communicating with the lateral through hole 22. Further, two opposite side walls defining the second hole 24 are respectively provided with a pivot groove 241, and two position tubular posts 25 are formed to extend upright on an upper surface of the solid portion 21 beside the first and the second hole 23 and 24. Further, an inverted U-shaped cap 29 is provided to cover on the two position tubular posts 25, having a hollow space 290 opening downward, and two holes 291 in the corresponding position of the posts 25 for screws 292 to fix the cap 29 with the posts 25. Further, an inverted L-shaped locking member 26 is provided to fit in the first hole 23, having a limit projection 261 for a coil spring 28 to fit around to be positioned in place, a sidewise portion 262 extending from an upper end to engage with a control member 27 fitted in the second hole 24. The control member 27 has an inclined Z-shape, having a flat press surface 271, a through hole 270 formed beside the press surface 271 for one of the two posts 25 to fit therein. The control member 27 further has a pivot means 272 respectively formed at two sides to engage the pivot grooves 241, and plate portion 273 projecting rearward pushed down by he sidewise portion of the locking member 26 elastically pressed down by the coil spring 28.

The wheel axle 30 has a flange 31 at a rear end, a opening 32 formed lengthwise in the rear end portion, a stop flange 33 formed in a front portion, a small axle portion 34 in front of the stop flange 33 to fit in the through hole 22 of the bracket member 20. The axle portion 34 has an annular groove 35 for the locking member 26 to fit in and lock the wheel axle 30 in place or separate from and unlock the axle 30.

Figure 2:
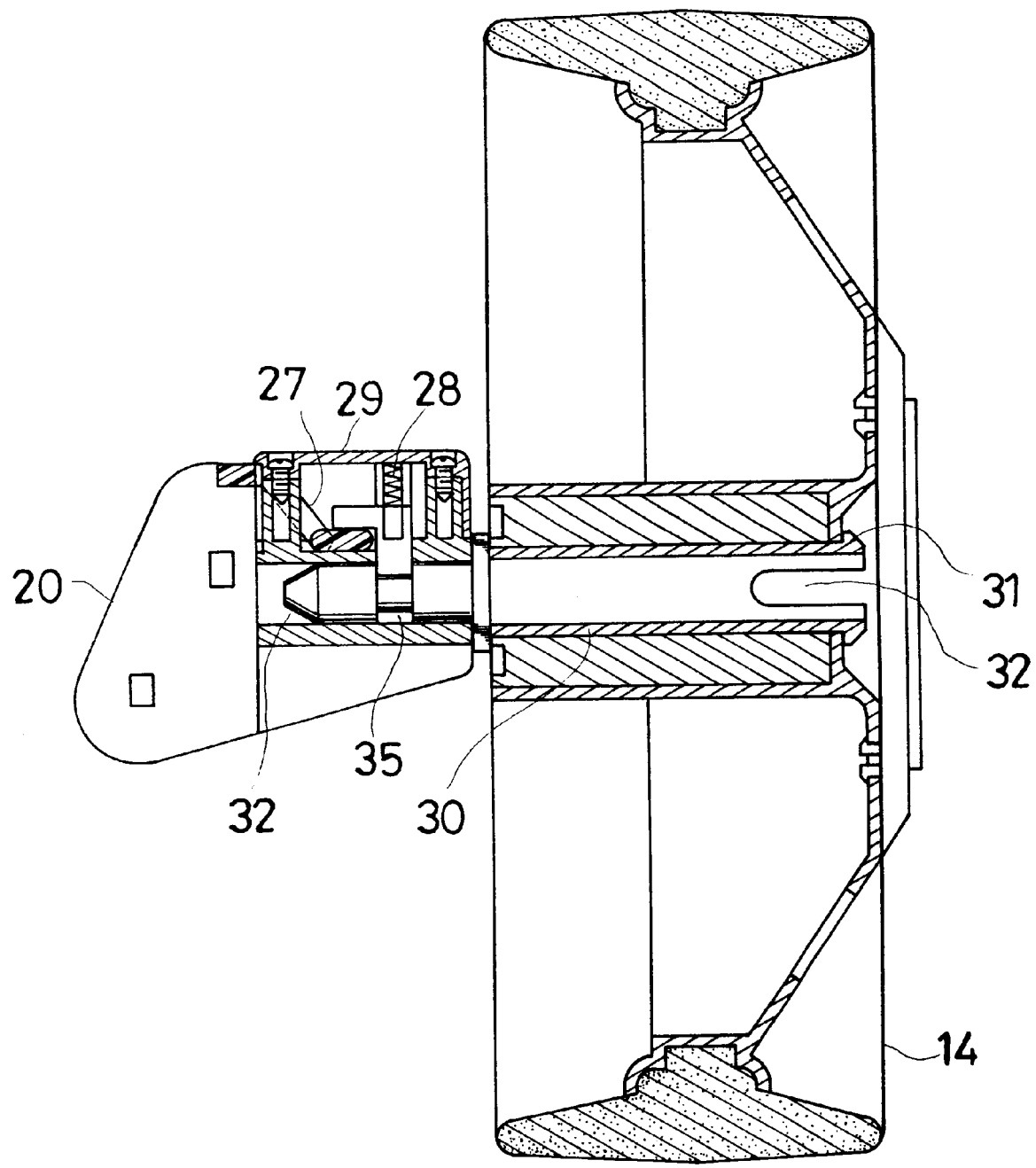
FIG. 2 is a cross-sectional view of the swift wheel locking device for a golf cart of the present invention.
Figure 4:
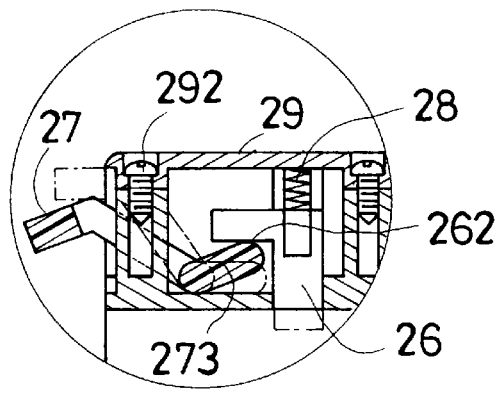
FIG. 4 is another cross-sectional view of the swift wheel locking device for a golf cart of the present invention, showing the position of the related components for locking the wheel axle.
Figure 3:
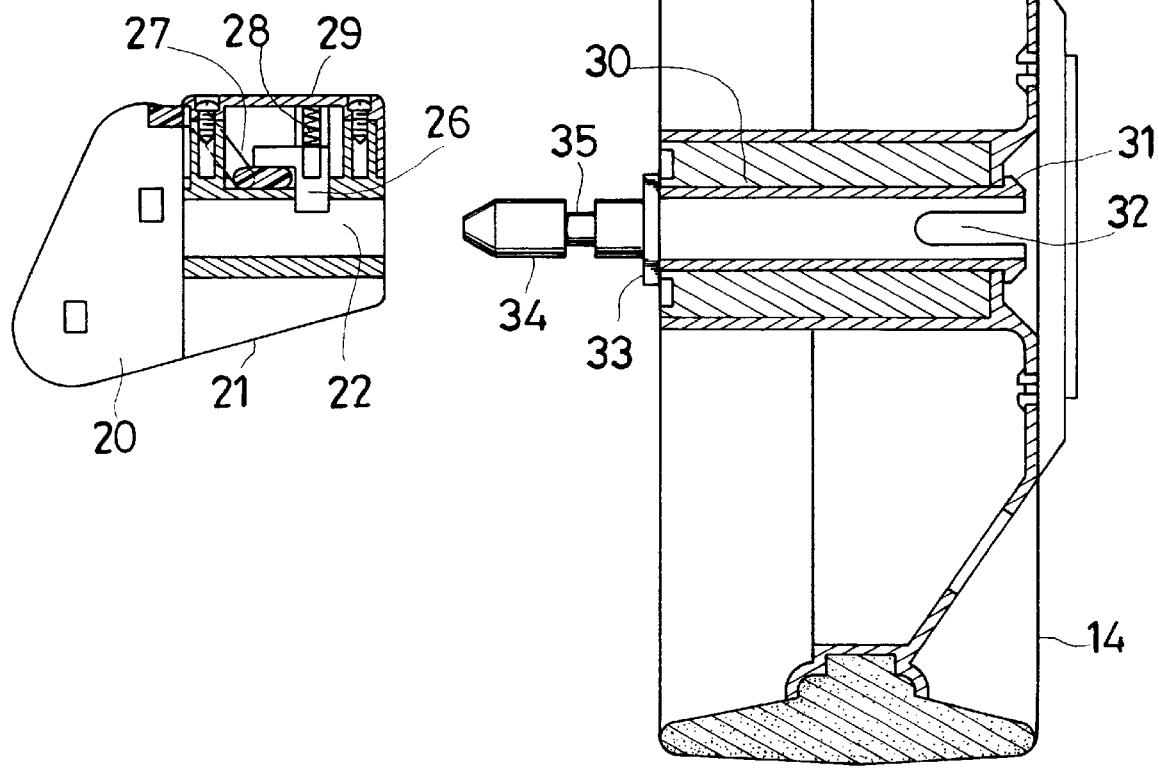
FIG. 3 is a cross-sectional view of the swift heel locking device for a golf cart of the present invention, showing the position of the related components for locking a wheel axle.

In using, referring to FIGS. 2, 3 and 4, After the wheels 14 are fitted around the wheel axle 30, the press portion 271 is pressed down, forcing the flat portion 273 raised up with the pivot means 272 functioning as a pivot so that the locking member 26 is lifted at the same time, with the sidewise portion 262 lifted up by the flat portion 273, and with the coil spring 28 compressed. Then the through hole 22 of the bracket member 20 is empty for the small axle portion 34 of the wheel axle 30 to extend therein. After the small portion 34 is inserted in the through hole 22, the press portion 271 is released, permitting the locking member 26 pushed down by the coil spring 28 recovering resilience. Then the lower end of the locking member 26 sticks in and engage the annular groove 35 of the wheel axle 30, finishing locking the wheels 14 for use.

If the wheels 14 with the axle 30 are wanted to be unlocked from the bracket member 20, only the control member 27 is pressed manually, and then they can be pulled out of the bracket member 20, quickly.

Figure 5:
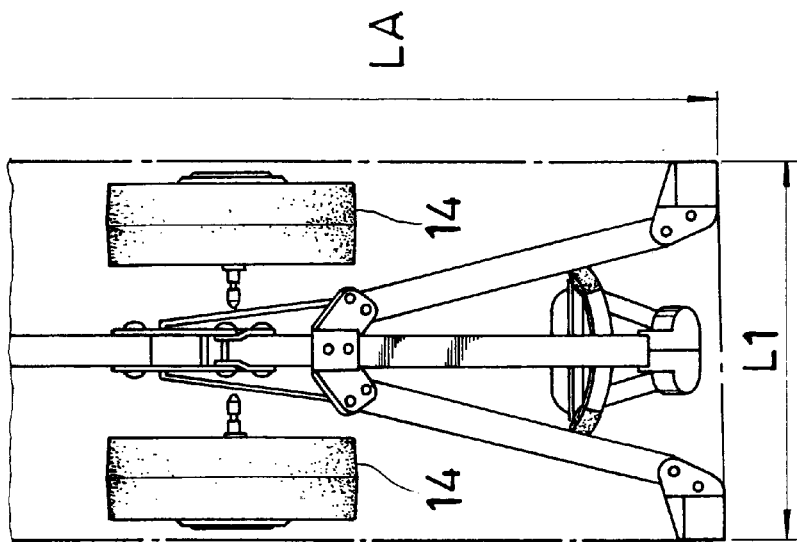
FIG. 5 is a front view of the wheel axle taken off the bracket members attached to lower legs of a golf cart of the present invention.
Figure 7:
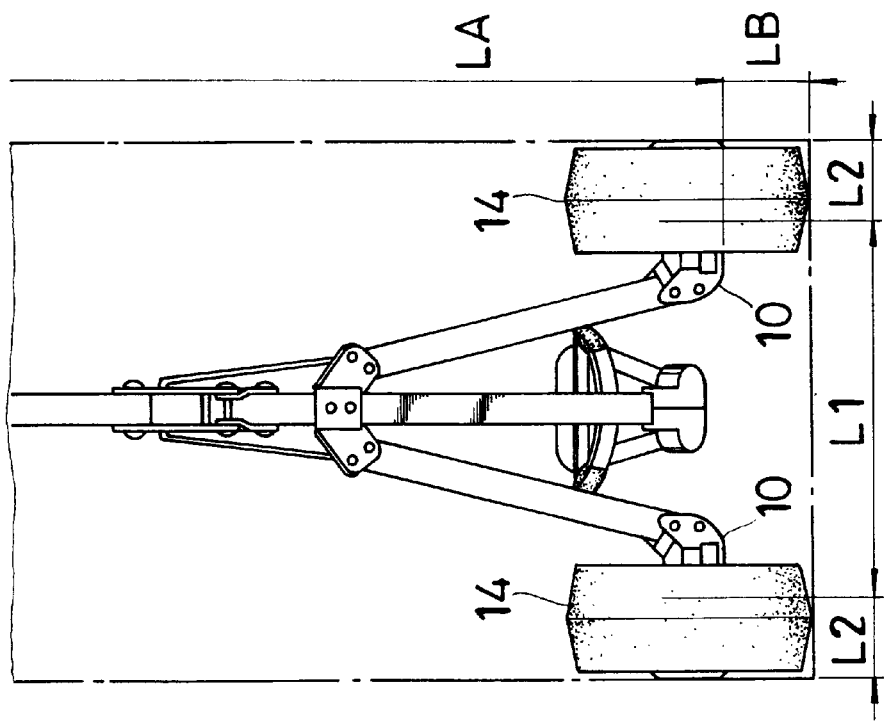
FIG. 7 is a partial front view of a golf cart provided with the conventional releasable wheel assembly shown in FIG. 6.
Figure 6:
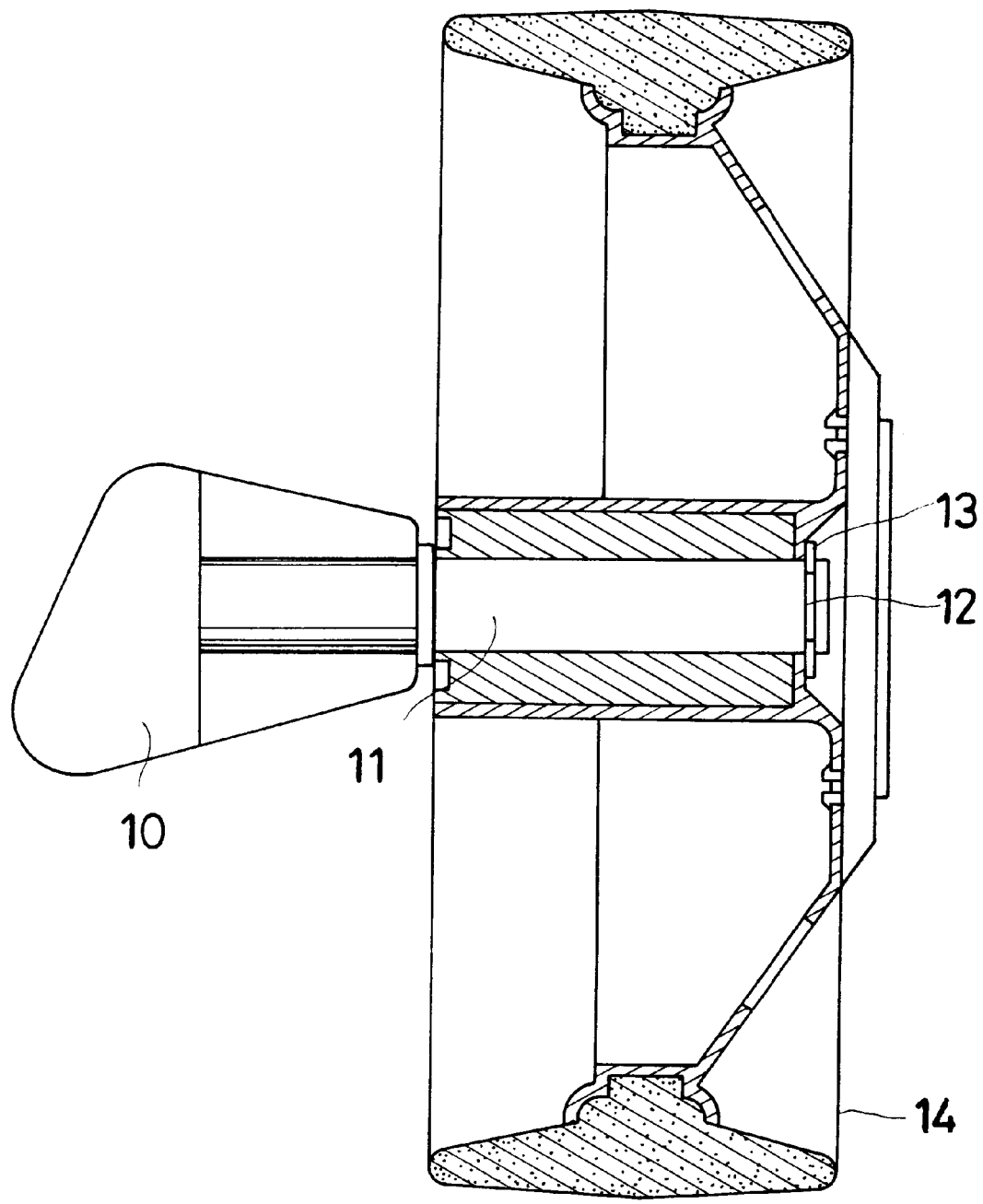
FIG. 6 is a cross-sectional view of a conventional releasable wheel assembly for a golf cart.
Figure 8:
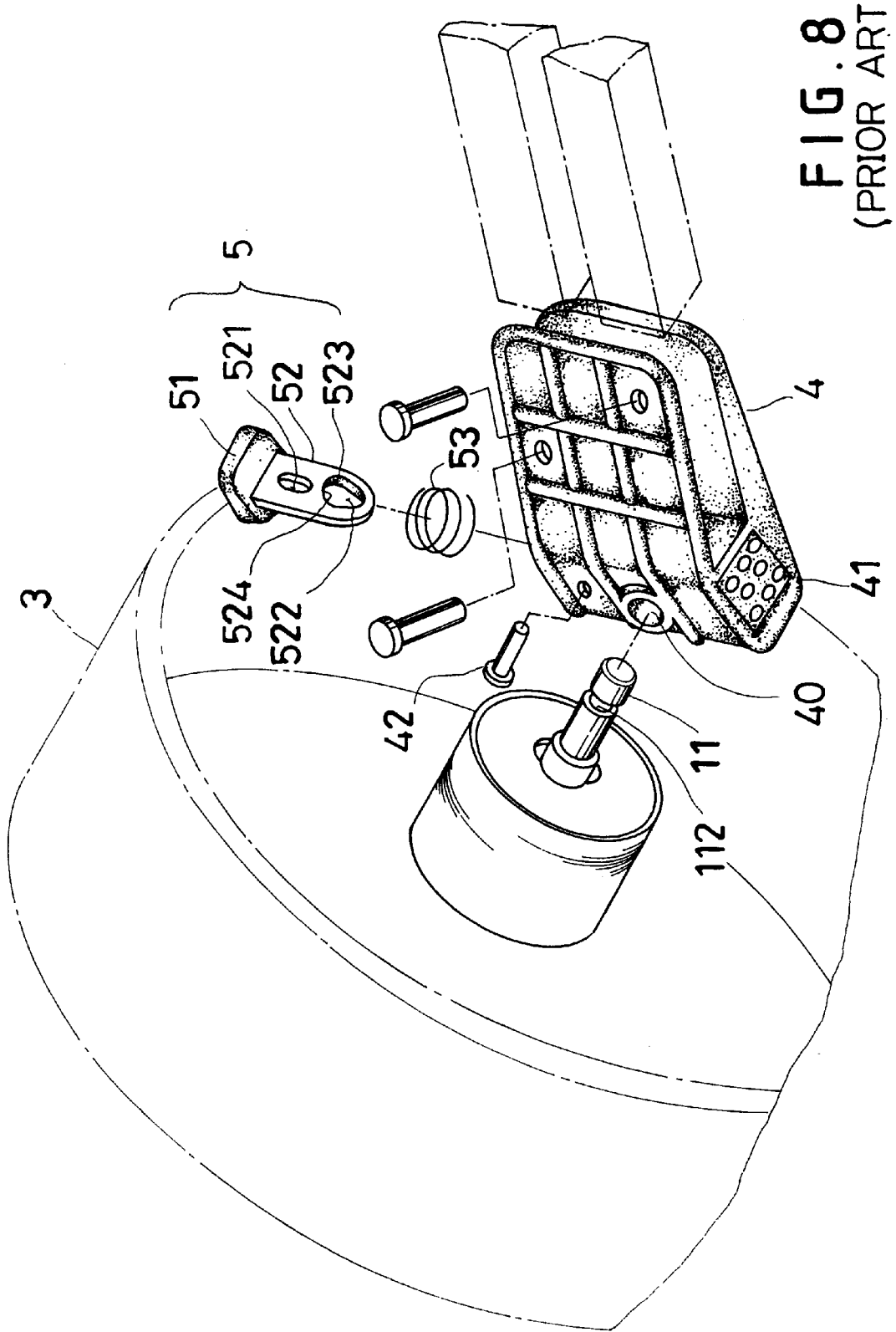
FIG. 8 is an exploded perspective view of the conventional releasable wheel assembly shown in FIG. 6.
Figure 9:
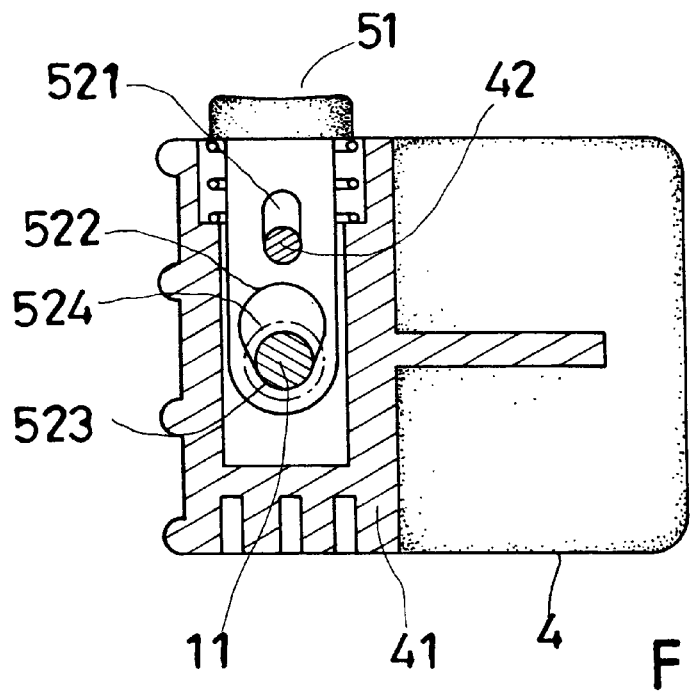
FIG. 9 is a cross-sectional view of the conventional releasable wheel assembly shown in FIG. 6, showing how the components move in locking the wheel axle; and, FIG. 10 is another cross-sectional view of the conventional releasable wheel assembly shown in FIG. 6, showing the relative position of the components locking the wheel axle.
Figure 10:
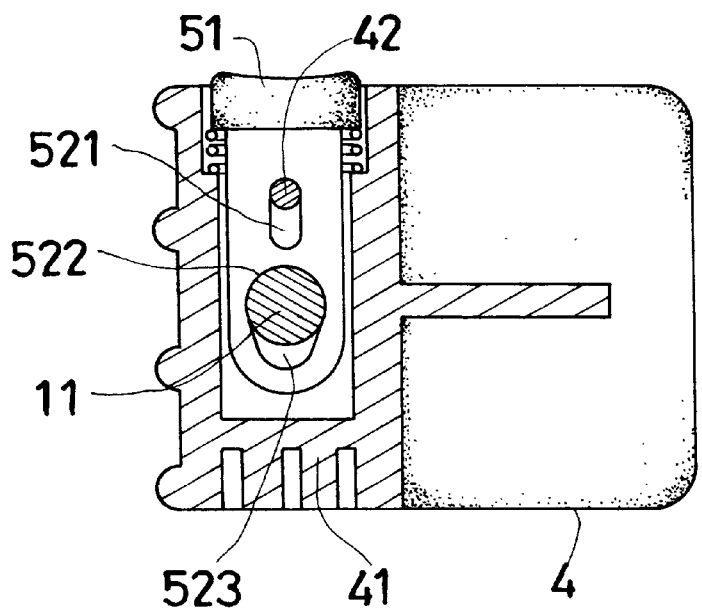

For transporting a gold cart provided with this invention, the wheels 14 with the axle 30 can be removed from the bracket members 20 and placed in a hollow space after the golf cart body is placed in a package carton, as shown in FIG. 5. Then the cost for packaging may be saved a log than the conventional ones having a larger dimensions needed as shown in FIG. 7.

As understood from the aforesaid description, the control member 27 can permit the wheel axle 30 to be engaged with or disengage from the bracket members 20 swiftly so that a golf cart with this invention may be used, packaged or transported very conveniently.

While the preferred embodiment of the invention have been described above, it will be recognized and understood that various modifications may be made therein and the appended claims are intended to cover all such modifications which, may fall within the spirit and scope of the invention.

What is claimed is:

1. A swift wheel locking device for a golf cart comprising;

a wheel axle formed integral and having a flange at an outer end, an opening formed lengthwise in the outer end portion with said flange, a stop flange formed in a front end, a small diameter axle portion formed in front of said stop flange, an annular groove formed in said small diameter axle portion;

a bracket member formed with a mounting slot which extends inwardly, a solid portion formed behind said slot and having a lateral through hole, a first hole formed communicating with said lateral through hole in an upper side wall of said solid portion for a locking member to fit through in, a second hole formed communicating with said lateral through hole beside said first hole in the upper side wall for a control member to fit therein, said locking member having a projection on an upper end for a coil spring to fit around and a sidewise portion extending from the upper end, said sidewise portion contained in said lateral through hole and contacting with a plate function portion of said control member fitted in said second hole, said control member having an upper flat press portion and a through hole beside said upper press portion, said solid portion having two circular posts spaced apart on the upper side beside said first hole and said second hole, an inverted U-shaped cap provided to cover on and fixed with said two circular posts by means of screws passing through two holes in said cap, said cap keeping said control member, said locking member and said coil spring in place in and on said solid portion, said press portion of said control member extending sidewise out of said cap so as to be pressed for locking and unlocking said wheel axle with said bracket member.

* * * * *